(12) United States Patent
Arriagada Carrasco et al.

(10) Patent No.: US 10,902,744 B2
(45) Date of Patent: Jan. 26, 2021

(54) BRAILLE AND/OR IN AUDITIVE MORSE CODE WRITING DEVICE, FOR USERS WITH VISUAL DISABILITIES AND/OR ANY MOTOR DISORDER

(71) Applicant: UNIVERSIDAD CATOLICA DE LA SANTISIMA CONCEPCION, Concepción (CL)

(72) Inventors: Eduardo Wladimir Arriagada Carrasco, Concepcion (CL); Jorge Eduardo Galleguillos Pizarro, Concepcion (CL); Paulina Giselle Molina Encina, Concepcion (CL)

(73) Assignee: UNIVERSIDAD CATOLICA DE LA SANTISIMA CONCEPCION, Concepcion (CL)

( * ) Notice: Subject to any disclaimer, the term of this patent is extended or adjusted under 35 U.S.C. 154(b) by 338 days.

(21) Appl. No.: 16/070,704

(22) PCT Filed: Jan. 21, 2016

(86) PCT No.: PCT/IB2016/050281
§ 371 (c)(1),
(2) Date: Jul. 17, 2018

(87) PCT Pub. No.: WO2017/125785
PCT Pub. Date: Jul. 27, 2017

(65) Prior Publication Data
US 2019/0027062 A1 Jan. 24, 2019

(51) Int. Cl.
*G09B 21/02* (2006.01)
*G06F 3/16* (2006.01)
(Continued)

(52) U.S. Cl.
CPC .............. *G09B 21/02* (2013.01); *B41J 3/32* (2013.01); *B41J 7/005* (2013.01); *B43K 29/005* (2013.01);
(Continued)

(58) Field of Classification Search
CPC .. G09B 21/02; B41J 3/32; B41J 7/005; B43K 29/08; G02B 21/00; G06F 3/03545; G06F 3/0433; G06F 3/16; G06F 3/0354
See application file for complete search history.

(56) References Cited

U.S. PATENT DOCUMENTS 6,130,664 A * 10/2000 Suzuki ................. G06F 3/0346
345/157
2012/0127088 A1 5/2012 Pance et al.
(Continued)

FOREIGN PATENT DOCUMENTS

KR 101123212 B1 3/2012
WO 2014169931 A1 10/2014

OTHER PUBLICATIONS

K.U. Kyung, et al; Haptic stylus and empirical studies on braille, button, and texture display; Journal of Biomedicine and Biotechnology; vol. 2008; Article ID 369651; 11 pages.
(Continued)

*Primary Examiner* — Timothy A Musselman
(74) *Attorney, Agent, or Firm* — Lucas & Mercanti, LLP

(57) ABSTRACT

A device and method for operating a device for writing in braille and/or in audio Morse code is disclosed, for users with visual impairments and/or a motor disorder, so that a user can take notes in real-time without the need for additional accessories, which comprises a housing (6) with an aspect and size similar to a common writing pencil, which comprises: a push-button (1) projecting from an end of the housing (6) of the device; a sound piezoelectric (2) mounted
(Continued)

within the housing (6); a microcontroller (3), mounted within the housing (6), in connection with: a memory (4) for storing data, the push-button (1) by means of an input of the microcontroller, and the sound piezoelectric (2) by means of an outlet pin of the microcontroller; wherein the microcontroller (3) is arranged to measure, each time the push-button (1) is actuated by the application of pressure, a time of pressure of the button, and to store said time of pressure in the memory (4), wherein the stored times of pressure are grouped on the basis of the similarity of the times of pressure in order to be recognized in a first group as a perforation and in a second group as an unperforated point.

30 Claims, 4 Drawing Sheets

(51) Int. Cl.
*B43K 29/08* (2006.01)
*G06F 3/023* (2006.01)
*G06F 3/043* (2006.01)
*G02B 21/00* (2006.01)
*B43K 29/00* (2006.01)
*G06F 3/0354* (2013.01)
*B41J 3/32* (2006.01)
*B41J 7/00* (2006.01)

(52) U.S. Cl.
CPC .............. *B43K 29/08* (2013.01); *G02B 21/00* (2013.01); *G06F 3/023* (2013.01); *G06F 3/03545* (2013.01); *G06F 3/0433* (2013.01); *G06F 3/16* (2013.01)

(56) References Cited

U.S. PATENT DOCUMENTS

2013/0321359 A1   12/2013  Zeliff et al.
2014/0028592 A1   1/2014   Wang et al.

OTHER PUBLICATIONS

International Search Report dated Oct. 13, 2016 for PCT/IB2016/050281 and English translation.

* cited by examiner

BRAILLE AND/OR IN AUDITIVE MORSE CODE WRITING DEVICE, FOR USERS WITH VISUAL DISABILITIES AND/OR ANY MOTOR DISORDER

CROSS REFERENCE TO RELATED APPLICATION

This Application is a 371 of PCT/IB2016/050281 filed on Jan. 21, 2016, which is incorporated herein by reference.

This application is related to helping people with visual impairment by the use of electronic components for reading or writing assistance. Specifically it refers to an electronic device similar to a pen for common writing, designed to digitally register and reproduce by sound means the writing made by a user with visual impairment and/or motor disorder according to the Braille or Morse system.

STATE OF THE ART

The integration of blind people to the educational system has been a social, methodological and technological challenge that has led to various research in techniques, methodologies and technologies in order to help the adaptation of visually impaired people.

One of the first reading systems for blind people was created by an Italian physicist named Francesco Lana. In his work of 1670, which proposes a way of writing and reading through touch. In turn, Charles Barbier (1767), pursuing a fast writing method manages to create the "Expediography" table, which with military purposes allows: 1) sending encrypted codes, 2) acceleration of writing under a procedure called "Steno" and 3) the feasibility of making copies without writing.

Louis Braille, based on the Barbier system, makes great improvements for the use by blind people, resulting in Braille. This system is based on 6 points arranged in two vertical columns of three dots each which allows to create 64 combinations, being possible to fit the alphabet, numbers, punctuation marks, musical notations, etc. (1837). Later, the "Interpoint" technique appears, allowing Braille writing on both sides of a sheet and the abbreviation in Braille systems, decreasing the volume of books and increasing the speed of writing.

With the advent of the computer and artificial intelligence, man-machine interaction for blind people is necessary. Optical devices and actuators appear as the first components applied to interaction with computer for blind people. Identification of characters from the screen and conversion to braille were the first contributions in touch detection for blind people on computer screens. Improvements of these interaction devices include: 1) Braille keyboard, 2) printers, 3) development of graphical interface, 4) Braille coding of the ASCII code, 5) voice synthesizers, among others, have facilitated the interaction with the computer. The exponential growth of the development of these technologies has enabled to include new database systems and platforms for the use of libraries, books and portable devices for the purpose of helping the integration of visual impairment.

Microcontroller development and integration of micrometric technologies have enabled the development of matrix sensors based on silicon conductors, pneumatic systems, piezoelectric systems, etc., and its implementation has focused on the development of touch screens for the blind. Mathematical modeling has enabled to facilitate computing environment programming reaching the integration of object code. One of the proposals that allows to simplify a graphic code is the vector graphic, which is one of the interesting proposals for application in programming environments for blind people. The latest technologies have evolved in improved sensors, actuators and software development such as speech synthesizers, which have been commonly used in cell phones, computers and various existing technologies to date.

Among the related products in the market is the "BrailleTouch" of Apple Inc.®, consisting of an application with which the user can type using braille directly on the screen of the "iPhone" or "iPod touch"®. This application uses a single divided keyboard based on the traditional Braille keyboard with 6 keys that allows typing messages and emails at high speed and in a much more accurate manner. On the other hand, the Braille electronic pen "Alfredo Digital" is a portable device for Braille, which communicates through an electronic notebook via Bluetooth, and allows visually impaired people to communicate with sighted people when it comes to writing and reading; because with this tool (pencil) the blind can write in braille and the sighted will be able to read it in printed or flat letters (notebook) and other visually impaired people will be able to hear them. The "EasyLink 12 Touch Irie-At" is a wireless Braille assistant that combines the benefits of access to the touch screen, a Braille display and writer in an ultra-portable design. And finally, the "Fingerreader" is an intelligent ring, developed by researchers of the MIT, and consists of a tiny camera that scans the letters and significantly outperforms the known scanner pencils or software such as Text Detective or SayText. It has a more advanced algorithm that allows to start, stop and skip the text at any time, read much faster and doing it with multiple words, not just one by one. Also it detects when the finger is out of line (and cover the letters) and the blanks when a line starts and ends, alerting the reader with subtle vibrations.

Current technologies solve this problem of writing for blind people through electronic tablets in which when certain buttons are pressed the braille writing is saved and converted into voice through a synthesizer. Recent advances allow to connect these tablets to computers and mobile allowing information transfer (export) to text processors. These technologies (despite being a great help for blind people) are not in widespread use due to high costs.

Among the more conventional systems that have been developed for writing of visually impaired people, such as Braille writing machines and printers, they have practical disadvantages in use, as the special paper for relief, large dimensions in the use of space to insert the braille writing, weight (braille machine), difficult handling elements (braille board) and high costs.

Regarding the state of the art, the following documents related to this technology were found:

Patent CN 101719327, relates to a device for Braille writing specially designed for blind people. The device consists of a pen and a Braille writing board. The pen has a tip and a pencil holder and a liquid storage device.

Furthermore, EP 2757543, relates to a portable electronic Braille reader including a capacitive screen in which information is inputted through an input port, where the information is decoded and encoded by a microprocessor in order to convert information into Braille characters, further including a thimble with elements capable of generating a stimulus in the finger of the reader to recognize the characters depicted on the screen.

Application WO 2002/006916 provides a portable reader for blind people, which receives electronic data and outputs data in a format that is readable in the Braille system. Data receiving means can be, for example, an optical scanner or a wireless phone that can receive communications by fax and/or Internet. Whereas the US patent application 2012/0065752 comprises a sound recorder, whose shape allows to be held by a hand and allows associating the functions of the recorder with the fingers. According to its characteristics it allows the user to quickly detect the orientation of the device. This is a compact device, thus minimizing the space required for use.

Unlike the aforementioned technologies, the present technology provides a single device, preferably in the shape of a pencil of common writing, with a single actuator to write, taking notes in real time in Braille or Morse code writing system, which allows the user to perform all operations without the need of additional accessories, improving portability.

This device uses as a single actuator a single button or a single push-button to perform all input operations, facilitating the use by the user.

It also allows to adapt to the speed of entry of information, related to the speed or pressure of the pulsations of the actuator for combinations of patterns in Braille or Morse of the user, facilitating the use by the user.

An additional objective is to provide the internal platform of the device that allows taking notes in real time, setting custom functions, programming applications, storing and transferring data to other storage devices, and reproducing data stored on the device.

GENERAL DESCRIPTION OF THE INVENTION

The present device of Braille or Morse code writing has a piezoelectric or button for all operations performed by the user. When activated the piezoelectric or button by pressing the device it measures the pressure and time of pressure of said button. Each time pressure is stored in a storage memory controlled by a microcontroller integrated in the device, where the stored data are grouped based on similarity of pressure times.

These pressure times are processed and converted into groups of data to represent a perforation (or perforation absence) in a point of the Braille pattern or for dashes or dots of the Morse code.

The times or pressures data sets are configured, which are selected at a mode of each group and its confidence interval, so that future data entries are saved in the storage device and his group is adjusted consistently to the writing speed of the user.

Each data associated with Braille is audibly reproduced through a speaker or piezoelectric for sound which receives a square frequency emitted by a microcontroller pin.

The internal programming of the microcontroller contains a functions platform for the user that allows to enter abbreviated information, time, date, among others.

DESCRIPTION OF THE INVENTION

The technology to be protected is a Braille and/or auditory Morse code writing device, for people with visual impairment and/or with a motor disorder.

Such device consists of a system of auditory or sound pulses and Braille writing recognition in two dimensions: pressure and/or writing time or Morse code recognition with pressure and/or writing time.

Figure 4:
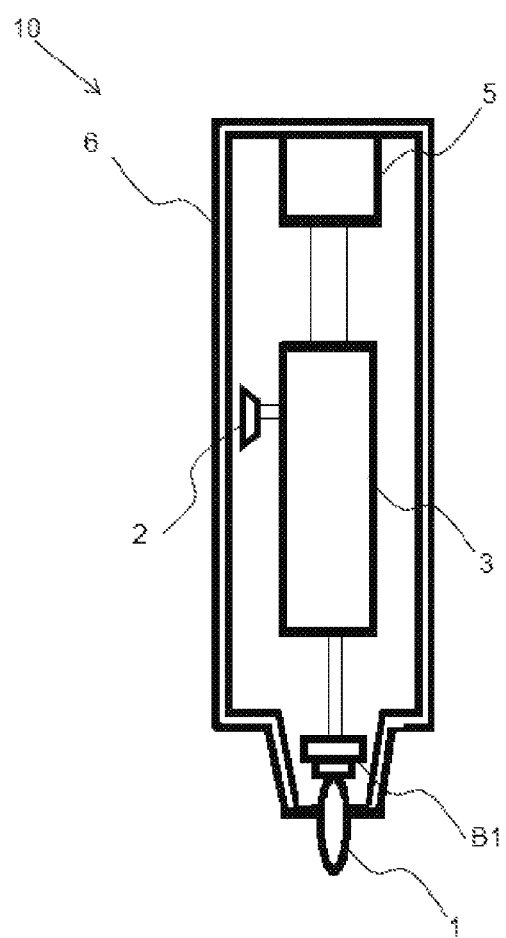
FIG. 4 schematically represents a preferred embodiment of the present device in the form of a pencil.
Figure 5:
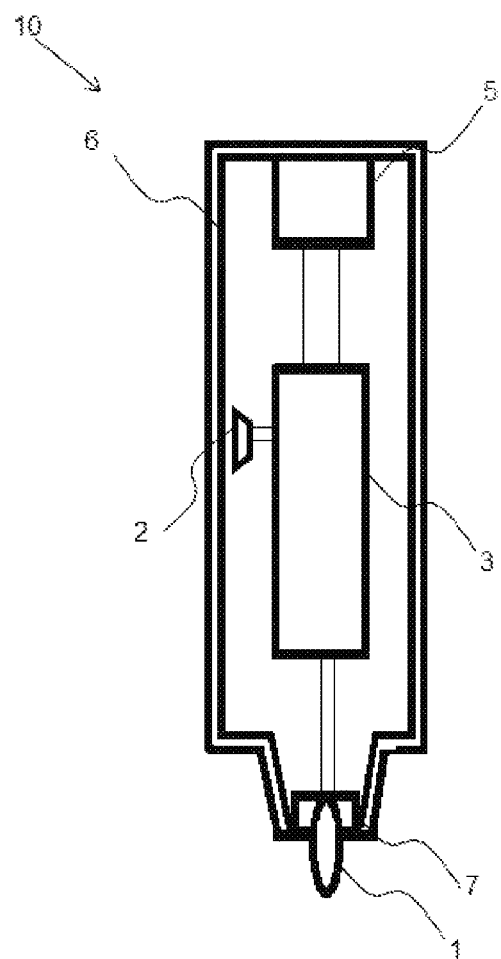
FIG. 5 shows another embodiment of the present device in the form of a pencil.

Its shape is like a common writing pen (see FIG. 4). This device has a housing (6) which can be plastic, metal or any material that allows easy handling and durability.

The device has a push-button (1) projecting from one end of the housing (6), the push-button (1) can operate a switch or button (B1) or a pressure piezoelectric (7) and is arranged for use similarly to the stylus used in Braille writing.

Figure 2:
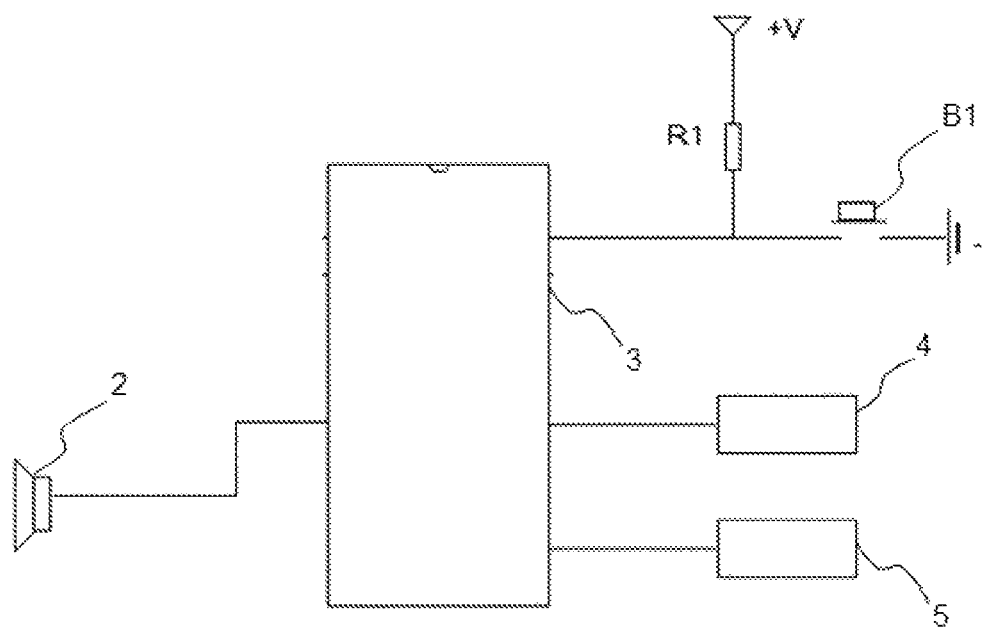
FIG. 2 shows a general scheme of the electronic design of a preferred embodiment of the present device with a switch or button (B1) which is actuated by the push-button (1).

Referring to FIG. 2, the electrical circuit of the device is disclosed in the case where the push-button (1) actuates a switch or button (B1). By pressing the button (B1) a logic value 1 is sent to a digital input of the microcontroller (3). The time of pressure of the button and/or the pressure are stored in the memory (4) by the microcontroller (3).

In the case where the push-button (1) activates a piezoelectric (7), the change of analog state of the pressure and of the time of pressure are measured. The two dimensions (pressure and pressure time) are stored improving recognition of the pattern (dot or dash).

Distinctively from conventional Braille writing, with the present device both the perforations and the unperforated points in a combination are associated with a pulse or pressure application over the button (1).

The recognition of a perforation is made on the basis of the pressure time on the push-button (1). Times are classified into two groups represented by their modes, adjusting the input data to a multimodal probability distribution.

By pressing the push-button (1) for a time, whether the switch or button or piezoelectric, the pressure time or the pushing pressure is classified in one of two modes or groups, identifying it as representative of a perforation (or dash) or a point (unperforated).

The initial configuration of the groups is performed with the first user inputs, the pressure times are discriminated between a perforation or a point when the time difference is large between each other, being classified in the corresponding group (first group: perforation, second group: point), in the same manner the dots and dashes of Morse code are identified. With each new entry of pressure time to recognize or classify a mode is calculated with a confidence interval for the group in which the pressure time classifies, allowing variability of the mode of each group. The above allows a self-adjust to the writing speed of the user.

Another initial configuration of the groups is performed with the first user inputs, the pressures on the push-button (1) are discriminated between a perforation or a point when the pressure difference is large between each other, being classified in corresponding group (first group: perforation; second group: point), in the same manner the dots and dashes of Morse code are identified. With each new entry of pressure to be recognized or classified and a mode is calculated with a confidence interval for the group in which classifies the pressure, allowing variability of the mode of each group. This allows self-adjust to the users typing speed.

Similarly the present device can use the first user inputs, the pressure on the push-button (1) and the time that is pressed the push-button (1) to discriminate between a perforation or a point when the pressure difference and time is large between each other, being classified in the corresponding group (first group: perforation; second group: point), in the same manner the dots and dashes of Morse code are identified.

By large differences is understood when pressures and/or times have a difference greater than 50% between a mode with a confidence interval for the group that classifies as 1 and the mode with a confidence interval for the group that classified as 0, allowing to differentiate each group according to the pressure exerted by the user and/or the time used by the user between a condition of pressing the push-button (1) and the other condition of not pressing the push-button (1) and thereby determining the 0 and 1 of each user according to his force and speed.

Figure 1:
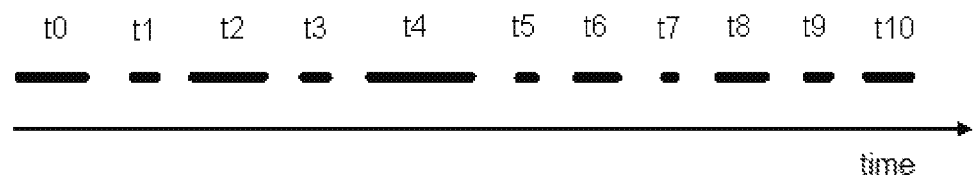
FIG. 1 shows a coding by pressure time and/or pressure of an exemplary use of the Braille or Morse code writing device.

In FIG. 1, a coding by pressure time is presented. Time t0, is recognized as mode1, and time t1 is recognized as mode2. With these modes, two groups are created, which accept the pressure times and/or the pressure when they fall in the accepted confidence interval. For example, in the first group, mode1 is recognized as perforation, and in the second group, mode2 as unperforated point.

In addition the present device is adapted according to internal functions programmed in an operation platform. The microcontroller has a small operating system, which allows programming of custom functions that can be annexed as the pencil evolves. For example, writing, deleting, reproducing, scheduling a time, date, number, name, scheduling meetings, among others.

In the following table some functions are encoded. It should be considered that the functions may evolve and can have an increasing dimension. Each zero in the function code represents a point and each one represents a perforation.

number of the function (writing: 100000, one pulse with long pressure time and five pulses with relatively shorter pressure time).

The reproduction of the writing is done using function 3 (100100). Information is reproduced through a high square frequency for "1" and a low square frequency for "0". Referring to FIG. 2, these square frequencies come out from an output pin of the microcontroller (3) to a sound piezoelectric (2), enabling an encoding of auditory pulses.

In alternative embodiments the size, design and number of buttons of the device may vary, depending on the functions or service modules attached to the device. The modules that can be attached to this device are varied. Some of them may be: 1) a liquid level measurement module for filling beverages in a reservoir, 2) voice synthesizer module for converting the Braille code, 3) GPS modules for location, 4) ultrasound module to identify objects that are around, 5) communication means for cell phones, computers or any technology that enables data storage and software.

In the manufacture of this device the following steps should be considered:

1. Design of the printed circuit for soldering electronic components.
2. Mounting of electronic components in each track designated by each element, as the microcontroller (3) or programmable integrated circuit, resistors, cables, buttons, voltages control, etc.
3. Mounting of welded plate with its components inside the housing (6).

Figure 3:
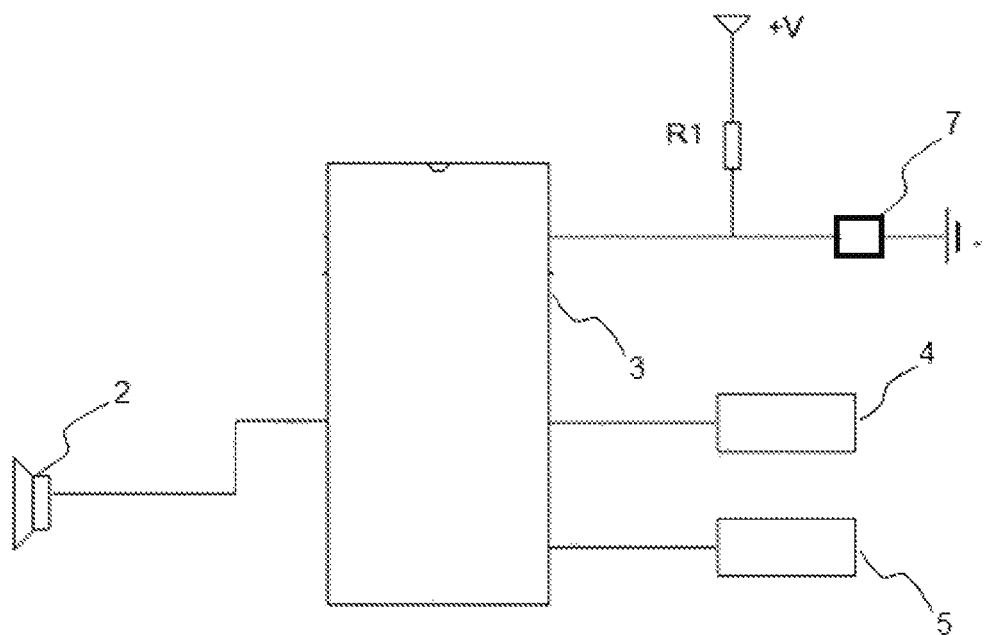
FIG. 3 shows a general scheme of the electronic design of another preferred embodiment of the present device with a pressure piezoelectric (7) which is actuated by the push-button (1).

FIGS. 2 and 3 show a general scheme of the electronic design that controls the operation of the pen. Note that the microcontroller (3) or programmable integrated circuit, depends on the characteristics of information storage that meet the selected needs of application.

FIG. 4 schematically represents the pen, where reference is made to its systemic parts, which are: the push-button (1), sound piezoelectric or speaker (2), the microcontroller (3), storage memory (4), communication means (5) by wire or wireless, and the housing (6). The communication means are to communicate the writing device to any computer or any device as a notebook, tablet and mobile smartphone connected to the internet or directly via cable.

The electronic design (FIG. 2) consists of a programmable integrated circuit (IC) or microcontroller (3), a switch or button (B1) or a pressure piezoelectric, configured with an electrical resistance (R1) connected to the button from the positive pole (V+) of the supply. This button is connected to

|  | Code |  |  |  |  |
|---|---|---|---|---|---|
| FUNCTION START | 111111 | 001111 |  |  |  |
| FUNCTION CODE |  | XXXXXX |  |  |  |
| FUNCTION END | 111111 | 001111 |  |  |  |
|  | 100000 | 110000 | 100100 | 100110 | 001111 |
| FUNCTION CODE | 1 | 2 | 3 | 4 | 5 |
| FUNCTION | WRITE | DELETE | REPRODUCE | HOUR PROGRAMMING | SCHEDULE |
| 1 | First cell blank | Delete all | From the start | Date | Write commitment |
| 2 | Specify title or cell |  | From cell or title | Hour | Date |
| 3 |  |  |  | Minute | Hour |
| 4 |  |  |  |  | Minute |
| 5 |  |  |  |  |  |
| SPACE | 000000 |  |  |  |  |
| DELETE CELL | 6 times pressed | Confirmed with a whistle |  |  |  |

EXAMPLE OF OPERATION

With the entry of code 111111, by the application of the user of six pulsations with similar pressure time (long) in the push-button (1), it is indicated that the pen must enter a function. Then it is shown that a numeric code will be entered (001111, two pulses with pressure time relatively shorter and four pulses with long pressure time), and the an input of the microcontroller (3). The memory (4) is connected to the microcontroller (3) which administers it. The output of the microcontroller (3) is connected to a speaker or sound piezoelectric (2) to replicate or reproduce audible frequencies of the stored pulses.

With the microcontroller (3) it is possible to install various additional functions, such as GPS modules for location or location of places, serial communication for data transfer to storage systems as a computer, USB storage device (Pendrive), etc. Ultrasound sensor for detecting objects in front of a person, liquid level sensors for applications of vessels filling such as glasses or cups, optical sensors for detecting colors in applications such as traffic light or the environment, among other systems or output modules such as tactile actuators.

The supply of the device is the conventional type such as batteries or rechargeable batteries, not shown in the figures, highlighting the possibility of adding automatic recharge modules as transformers, photovoltaic cells, among others, not shown in the figures.

Advantages

The basic use of this pen-like device, allows to write notes in real-time in presentations, lectures, classes in classrooms or simple notes. The device being a great support for blind people, visually impaired people and/or with some motor disorder that are inserted in school and university education, among others.

The Braille or Morse code writing device can have different sizes to be portable, but preferably has the size of a pencil which favors its portability. It is understood by the normal size of a pencil between 4 cm. to 30 cm. This device is useful to take notes or annotations anywhere and does not require additional elements as with other prior art technologies.

This device does not need a sheet and does not require extra accessories to be used. Solving the problems of space, transport, weight, additional elements and handling.

The present device allows variability of the mode of each group (perforations, points) allowing self-adjust to the writing speed of the user.

DETAILED DESCRIPTION OF THE PREFERRED EMBODIMENTS

As shown in FIGS. 2 to 5, this Braille and/or auditory Morse code writing device, for a user with visual impairment and/or with a motor disorder, so that the user can take notes in real time without the need of additional accessories, wherein said device comprises a housing (6) with an appearance and size similar to a common writing pencil, a supply means, further comprises:
  a. a push-button (1) projecting from one end of the housing (6) of the device, which acts on a sensor;
  b. a sound piezoelectric (2) mounted within the housing (6);
  c. a microcontroller (3), mounted within the housing (6), in connection with: a memory (4) for data storage, with the push-button (1) by means of a microcontroller input, and with the sound piezoelectric (2) by means of an output pin of the microcontroller;
  wherein the microcontroller (3) is arranged to measure, each time the push-button (1) is actuated by applying pressure on the sensor delivering an electrical output that is processed and converted into data, and to store said data in the memory (4) in which data are stored and grouped;
  d. a communication means (5) connected to the microcontroller (3) to communicate in a wired or wireless manner the writing device with other devices.

In a preferred embodiment the sensor is a switch or button (B1) which is actuated by the push-button (1) when it is operated by the user, wherein the electrical output from the actuator is obtained from the time the push-button (1) is pressed on the button (B1), data sent to the microcontroller (3) is a time of pressure of the push-button (1) over the button (B1), wherein the microcontroller (3) groups into a first group and a second group, data corresponding to the times of pressure over the push-button (1) on the basis of similarity of pressure times in order to be recognized in a first group as a perforation and in a second group as an unperforated point for the Braille type writing or for dashes or points in the Morse code, wherein the microcontroller (3) determines a mode and confidence intervals for each of the first group and the second group.

A new data entry associated with a new time of pressure of the push-button (1) is stored in the memory (4), and the mode and confidence interval of the group in which classifies the new pressure time are adjusted, so that recognition adapts to the writing speed of the user.

In another preferred embodiment the sensor is a pressure piezoelectric (7), which is actuated by the push-button (1) when it is operated by the user, where the electrical output from the actuator is obtained from a pressure of the push-button (1) over the pressure piezoelectric (7), wherein the data sent to the microcontroller (3) is a pressure of the push-button (1) over the pressure piezoelectric (7), wherein the microcontroller (3) groups into a first group and a second group data corresponding to the pressures of the push-button (1) based on the similarity of pressures in order to be recognized in a first group as a perforation and in a second group as an unperforated point for the Braille type writing or for dashes and points of Morse code, the microcontroller (3) determines a mode and confidence intervals for each of the first group and the second group.

A new data entry associated with a new pressure of the push-button (1) is stored in the memory (4), and the mode and confidence interval of the group in which classifies the new pressure are adjusted, so that recognition adapts to the writing speed and pressure of the user.

Audibly reproducing a time of pressure and/or the pressure is performed through the sound piezoelectric (2) by receiving a square frequency from the output pin of the microcontroller (3) to which it is connected, and the microcontroller (3) provides the sound piezoelectric (2): a high square frequency for the times of pressure or the pressure classified as a perforation, and a low square frequency for the times of pressure or the pressure classified as point in the case of Braille or for points and dashes in the case of Morse code, the playback of the times of pressure stored in the memory (4) is made in response to the input of a preset combination of times of pressure by the user.

The supply means are a battery or rechargeable batteries to power the device and the recharge modules can be: transformers, photovoltaic cells.

An electrical resistance (R1) is connected to the button (B1) from the positive pole of the supply at the same point where the button is connected to the microcontroller (3), wherein when the button (B1) is pressed a logical state of value 1 is sent to the input of the microcontroller (3) to which it is connected.

In another embodiment, the push-button (1) activates the pressure piezoelectric (7) and the microcontroller (3) measures the analog state change of the piezoelectric through the pressure, and recognizes and stores the pressure exerted on the piezoelectric, wherein the push-button (1) activates the pressure piezoelectric (7) and the microcontroller (3) measures the analog state change of the piezoelectric through the pressure and the pressure time, and recognizes and stores the pressure and pressure time exerted on the piezoelectric.

The communication means (5) is a wireless Internet antenna or Bluetooth or other wireless communication means or is a wire connector, such as USB connectors, micro USB among other connectors used in computers.

Method of Braille and/or auditory Morse code writing, for users with visual impairments and/or with motor disorders, so that a user can take notes in real time without the need of additional accessories, wherein the device has a housing (6) with an aspect and size similar to a common writing pen, comprising the steps of:

a. setting the order of interpretation of the inputs of short pressure times or low pressure "0" or the inputs of long times of pressure or greater pressure "1";

b. actuating a push-button (1), in connection with an input of a microcontroller (3) by application of pressure by the user;

c. measuring a time of pressure or the pressure, by the microcontroller (3), each time the switch (1) is actuated;

d. storing, by the microcontroller (3), said time of pressure or the pressure in a memory (4);

e. grouping, by the microcontroller (3), the stored times of pressure or the pressure on the basis of similarity of times of pressure or pressure in order to be recognized in a first group as a perforation, and in a second group as an unperforated point.

Wherein the microcontroller (3) additionally determines a mode and confidence intervals for each of the first group and the second group.

Wherein a new data entry associated with a new time of pressure or the pressure on the push-button (1) is stored in memory, and is adjusted to the mode and confidence interval of the group in which classifies the new time of pressure or the pressure, so that it adapts to the writing speed of the user, by recognizing the first group and the second group.

Wherein also the audible playback of a time of pressure or the pressure is made through the sound piezoelectric (2) by receiving a square frequency from the output pin of the microcontroller (3) to which it is connected.

Wherein also the microcontroller (3) provides to the sound piezoelectric (2): a high square frequency for the times of pressure classified as perforation, and a low square frequency for the times of pressure classified as point.

Wherein the reproduction of the times of pressure stored in the memory (4) is made in response to the input of a preset combination of times of pressure by the user.

Wherein also when the push-button (1) is pressed, being a button (B1), it sends a logic state of value 1 to the input of the microcontroller (3) to which it is connected.

Wherein additionally, the push-button (1) being a piezoelectric, the microcontroller (3) measures the analog state change of the piezoelectric over time, and recognizes and stores the time of pressure of the piezoelectric.

Application Example: In Situ Tests

The present device was tested in three visually impaired people, randomly selected, to demonstrate the usefulness of the auditory-pulse device.

Prior to this activity, alphabet tests were carried out with Braille-type code and words written in this code. To do this, an emulator was used as a system to reproduce the buttons such as the ones comprised in the device.

The system was instructed such that each Braille cell emits a high or low frequency sound, depending on the letter that is intended to reproduce.

Two sessions of two hours each were conducted, of tests of writing letters and words and reading with this system and visually impaired people. It took to the three people who knew the Braille code half an hour to learn to use the device.

In this example, it was configured the order of interpretation of the entries of short times of pressure or low pressure "0" or the entries of long times of pressure or greater pressure "1" to know the place of the Braille combination that corresponds within the matrix of 3 rows and 2 columns of Braille code. For example, the first pulse "0 or 1" is the first row first column, the second pulse "0 or 1" is the first row second column, the third pulse "0 or 1" is the second row first column, the fourth pulse "0 or 1" is the second row second column, the fifth pulse "0 or 1" is the third row first column, and the fifth pulse "0 or 1" is the third row second column.

The qualitative acceptance and validation of the product was 100%.

In an alternative example the Braille combination can be configured by filling columns from left to right in descending order.

This configuration of rows and columns is modified according to the user before using the device.

The invention claimed is:

1. A writing device for Braille and/or auditory Morse code writing, for a user with visual disabilities and/or with motor disorders, so that the user can take notes in real time without the need of additional accessories, wherein said device comprises one housing with an aspect and size similar to a common writing pencil, a feeding means, comprising:

a. a push-button projecting from one end of the housing of the device, actuating on a sensor;

b. a sound piezoelectric mounted within the housing;

c. a microcontroller, mounted within the housing, in connection with: a memory for data storage, the push-button by means of a microcontroller input, and the sound piezoelectric by means of an output pin of the microcontroller;

wherein the microcontroller is arranged to measure, each time the push-button is actuated by applying pressure on the sensor which delivers an electrical output that is processed and converted into data, and to store said data in the memory in which data are stored and grouped;

d. a communication means connected to the microcontroller to communicate in a wired or wireless manner the writing device with other devices.

2. The writing device of claim 1, wherein the sensor is a switch or button which is actuated by the push-button when the latter is operated by the user.

3. The writing device of claim 2, wherein an electrical resistance is connected to the button from the positive pole of the supply, at the same point where the button is connected to the microcontroller.

4. The writing device of claim 3, wherein when the button is pressed it sends a logic state of value 1 to the input of the microcontroller to which it is connected.

5. The method of writing of claim 4, wherein a new data entry associated with a new time of pressure or the pressure on the button is stored in memory, and is adjusted to the mode and confidence interval of the group in which classifies the new time of pressure or the pressure, so that it adapts to the writing speed of the user, by means of the recognition of the first group and the second group.

6. The method of writing of claim 4, wherein the auditory playback of a time of pressure or the pressure is performed through the sound piezoelectric by receiving a square frequency from the output pin of the microcontroller to which it is connected.

7. The method of writing of claim 3, wherein the microcontroller determines a mode and confidence intervals for each of the first group and the second group.

8. The method of writing of claim 3, wherein when the push-button is pressed, being a button, it sends a logic state of value to the input of the microcontroller to which it is connected.

9. The method of writing of claim 3, wherein the push-button being a piezoelectric, the microcontroller measures the analog state change of the piezoelectric over time, and recognizes and stores the time of pressure of the piezoelectric.

10. The writing device of claim 2, wherein the electrical output from the actuator is obtained from the time of pressure of the push-button over the button.

11. The writing device of claim 10, wherein the auditory playback of a time of pressure and/or the pressure is made through the sound piezoelectric by receiving a square frequency from the output pin of the microcontroller to which it is connected.

12. The writing device of claim 10, wherein the microcontroller provides to the sound piezoelectric: a high square frequency for the times of pressure or pressure classified as perforation, and a low square frequency for the times of pressure or pressure classified as point for Braille or for points and dashes of the Morse code.

13. The writing device of claim 10, wherein the data sent to the microcontroller is a time of pressure of the push-button over the button, wherein the microcontroller groups into a first group and a second group the data corresponding to the times of pressure of the push-button on the basis of similarity of times of pressure data in order to be recognized in the first group as a perforation and a second group as an unperforated point for the Braille type writing or for dashes and points of the Morse code.

14. The writing device of claim 13, wherein the reproduction of the times of pressure stored in the memory is performed in response to entry of a preset combination of times of pressure by the user.

15. The writing device of claim 13, wherein the microcontroller determines a mode and confidence intervals for each of the first group and the second group.

16. The writing device of claim 15, wherein a new data entry associated with a new time of pressure of the push-button is stored in the memory, and the mode and confidence interval of the group in which classifies the new time of pressure is adjusted, so that the recognition adapts to writing speed of the user.

17. The writing device of claim 1, wherein the sensor is a pressure piezoelectric, which is actuated by the push-button when it is operated by the user.

18. The writing device of claim 17, wherein the push-button actuates the pressure piezoelectric, and the microcontroller measures the analog state change of the piezoelectric through the pressure, and recognizes and stores the pressure exerted on the piezoelectric.

19. The writing device of claim 17, wherein the electrical output from the actuator is obtained from a pressure of the push-button over the pressure piezoelectric.

20. The writing device of claim 19, wherein the push-button actuates the pressure piezoelectric, and the microcontroller measures the analog state change of the piezoelectric through the pressure and the time of pressure, and recognizes and stores the pressure and the time of pressure over the piezoelectric.

21. The method of writing of claim 20, wherein the microcontroller provides to the sound piezoelectric: a high square frequency for the times of pressure classified as perforation, and a low square frequency for the times of pressure classified as point.

22. The method of writing of claim 20, wherein the reproduction of the times of pressure stored in the memory is performed in response to input of a preset combination of times of pressure by the user.

23. The writing device of claim 19, wherein the data sent to the microcontroller is a pressure of the push-button on the pressure piezoelectric, wherein the microcontroller groups into a first group and a second group the data corresponding to the pressures of the push-button based on the similarity of pressures in order to be recognized in the first group as a perforation and in a second group as an unperforated point for the Braille type writing or for dashes or points of the Morse code.

24. The writing device of claim 23, wherein the microcontroller determines a mode and confidence intervals for each of the first group and the second group.

25. The writing device of claim 24, wherein a new data entry associated with a new pressure of the push-button is stored in the memory, and the mode and confidence interval of the group in which classifies the new pressure is adjusted, so that the recognition adapts to the speed and pressure of the writing of the user.

26. The writing device of claim 1, wherein the supply means is a battery or rechargeable batteries to power the device.

27. The writing device of claim 26, wherein it comprises charging modules such as: transformers, photovoltaic cells.

28. The writing device of claim 1, wherein the communication means is a wireless Internet or Bluetooth antenna.

29. The writing device of claim 1, wherein the communication means is a wired connector.

30. A method of Braille and/or auditory Morse code writing, for users with visual disabilities and/or with motor complexities, so that a user can take notes in real time without the need of additional accessories, wherein the device is a writing device according to claim 1, the method comprising the steps of:
   a. setting an order of interpretation of entries of short times of pressure or low pressure "0" or entries of long times of pressure or greater pressure "1";
   b. actuating the push-button, in connection with an input of the microcontroller, by applying pressure by the user;
   c. measuring a time of pressure or the pressure, by the microcontroller, each time the push-button is actuated;
   d. storing, by the microcontroller, said time of pressure or the pressure in the memory;
   e. grouping, by the microcontroller, the times of pressure or the pressure stored on the basis of similarity of times of pressure or the pressure in order to be recognized in the first group as a perforation, and in a second group as an unperforated point.

* * * * *